United States Patent [19]

Schwerzel et al.

[11] 4,105,014

[45] Aug. 8, 1978

[54] CATALYTIC EXTRACTION OF STORED SOLAR ENERGY FROM PHOTOCHEMICALS

[75] Inventors: Robert E. Schwerzel; Nancy E. Klosterman; John Robert Kelly; Louis J. Hillenbrand, all of Columbus, Ohio

[73] Assignee: Battelle Development Corporation, Columbus, Ohio

[21] Appl. No.: 761,912

[22] Filed: Jan. 24, 1977

[51] Int. Cl.$^2$ ............................................. F24H 7/00
[52] U.S. Cl. .................................... 126/270; 126/400
[58] Field of Search ................. 204/158 R; 126/270, 126/271; 237/81; 432/29, 30

[56] References Cited

U.S. PATENT DOCUMENTS

| 4,004,572 | 1/1977 | Nathan et al. | 126/270 |
| 4,004,573 | 1/1977 | Frieling et al. | 126/271 |

Primary Examiner—Howard S. Williams
Attorney, Agent, or Firm—Kenneth R. Warburton

[57] ABSTRACT

Acid and base catalyst substances are employed in the photochemical process for collection and retrieval of solar energy wherein a lower energy level isomer (e.g. trans-isomer) of a photochemical isomerizable compound is exposed to solar energy of a wavelength providing a higher energy level isomer (e.g. cis-isomer) of this isomerizable compound and this higher energy level isomer subsequently is transformed to its lower energy level isomer with exothermic release of thermal energy for useful purposes. In this process the transforming or conversion of the higher energy level isomer to its lower energy level isomer is facilitated by the presence of and/or contacting with the acid or base catalyst substance. The employed catalytic acid, or base, or mixture of acids, or mixture of bases are characterized by being art accepted strong acids or strong bases under either the Brönsted or Lewis concepts of acids and bases in the fluid in which transformation to the lower energy level isomer is carried forth and also characterized as being compatible with the particular fluid and photoisomerizable compound with which they are employed. The employed acids or bases are useful in a diversity of amounts and a diversity of forms and configurations.

8 Claims, 3 Drawing Figures

CATALYTIC EXTRACTION OF STORED SOLAR ENERGY FROM PHOTOCHEMICALS

RELATED APPLICATIONS

Portions of the present invention are disclosed without being claimed in U.S. Pat. Nos. 4,004,572 and 4,004,573, issuing Jan. 25, 1977 from pending U.S. patent applications:
Ser. No. 592,029
Filed—June 30, 1975
Inventors—Richard A. Nathan et al.
Title—"Solar Energy Collection and Retrieval Employing Reversible Photochemical Isomerization";
and
Ser. No. 643,829
Filed—Dec. 23, 1975
Inventors—Donald H. Frieling, Sherwood G. Talbert, and Richard A. Nathan
Title—Process and Apparatus for Solar Energy Collection and Retrieval
and although major portions of those two pending applications are repeated in this present application, by this reference to those two pending applications they each are incorporated by reference in their entirety into the Disclosure of this application.

DISCLOSURE

This invention lies in the art of photochemical storage and retrieval of solar energy wherein a lower energy level isomer of an isomerizable compound upon exposure to solar radiation transforms to a higher energy isomer which subsequently is transformed back to the lower energy level isomer with an accompanying release of useful exothermic thermal energy and concerns an improvement therein of a chemical catalyzation of the transforming of the higher energy level isomer. More particularly, the present invention concerns the foregoing improvement employing particular acid or base compounds for the employed catalyst and contacting the catalyst and the higher energy level isomer in a liquid medium to provide the lower energy level isomer with accompanying exothermic thermal energy release.

Desirably the photochemical collection, storage, and retrieval of solar energy is with employment of a photochemical isomerizable composition in the visible light spectrum of solar radiation undergoing a geometrical isomerication (e.g., trans to cis isomerization) from a thermodynamically stable isomer of lower energy content to a thermodynamically less stable, but kinetically stable, isomer of higher energy content. More particularly and desirably the invention involves exposure to solar radiation of a thin liquid layer, containing the lower energy level trans isomer, for a time sufficient to isomerize at least a significant portion thereof to its higher energy level cis isomer, and a subsequent chemical catalysis of a heat-triggered conversion of the higher energy level cis isomer to its lower energy level trans isomer with a portion of the released thermal energy being utilized to continue the heat-triggering conversion and with another portion thereof being available for useful thermal energy applications and purposes.

BACKGROUND

The use of sunlight (i.e., solar energy) to supply human needs for energy is of prime importance in view of man's gradual depletion of more conventional energy sources such as fossil fuels of coal, oil, and the like.

Prior Art

One known approach to solar energy collection and utilization, termed herein a "conventional" thermal solar energy system, is based upon the heat produced when a blackened surface is exposed to sunlight. Such a system utilizes a solar collector in which a sheet of blackened metal serves to heat a working fluid, typically air, water, or water-glycol mixtures. The use of flat plate collectors is preferable to the use of the parabolic type, not only because the latter is considerably more expensive, but also because flat plate collectors can more efficiently utilize diffuse radiation. In such a system, the working fluid, e.g., water, is circulated through the collector (often over the plate or through tubes or the like affixed to the back side of the blackened plate collector) causing the fluid to absorb sensible heat (rise in temperature). There are, of course, many modifications possible to such a system, but in the simplest the hot fluid then is stored in an "energy storage tank" where it is held until the energy is needed for heating or cooling purposes. At that time the hot fluid can be drawn off to run an air conditioning or heating system. During this heating or cooling process, the fluid loses much or all of its sensible heat (energy) and then is recirculated to the collector to pick up additional energy. The simplicity, safety, and potentially low operating cost of thermal solar energy systems have already led to the commercial installation of prototype systems for applications, such as the heating of water for homes, offices, schools, libraries, and apartment complexes in some locations throughout the world.

However, a number of problems and disadvantages are inherent in a conventional thermal solar energy system. Maximum instantaneous efficiency of present-day flat-plate collectors is only about 40 percent. More realistically, an average daily collection efficiency on a sunny day might approach 20 percent. That is, given a solar flux capable of delivering 1.0 million Btu/day to a collector, water circulated through the collector could gain only about 0.2 million Btu/day, primarily because of optical and thermal losses. Additionally, a serious limitation to the thermal system is that the system can operate effectively only so long as there is appreciable sunlight. That is, in a thermal solar energy system there is a threshold value of light necessary before the system can be put in use. Furthermore, a thermal system will incorporate some type of short-term heat storage such as heated water, rock, or eutectic salt mixtures to smooth out the operation of the system during the night and during cloudy periods. The cost of the thermal system, including principally the cost of the collector and insulated storage, is such that it is impractical to store more heat in this way than can operate a building's heating and cooling system for a period between several hours and a few days. As a result, there are drawbacks with thermal systems which have to operate throughout the winter in the highly populated temperature-zone climates distant from the equator, where there is both cold weather and considerable cloud cover. The collector must heat up to an operating temperature before the system can be turned on. Even on bright winter days in such climates, the system might be usable for only 2 or 3 hours each day. On cold, cloudy days, it is doubtful that a thermal solar energy system could be used at all. During such periods when the thermal solar energy system is unable to operate, an auxiliary energy source (e.g., electricity) needs to be available and used to supply energy for a consumer system's needs.

Other approaches taught for solar energy collection and utilization have sought to employ various principles and means, such thermoelectric conversion based on solar heating of one junction of a thermocouple of dissimilar metals (Seebeck principle), and photovoltaic conversion of solar radiation directly to electrical power by photovoltaic cells. These approaches also have limitations and disadvantages, a principal one that of being much too expensive for general use.

Photochemical conversion of solar radiation is another approach for converting solar energy into useful work. Biological photochemical processes occur naturally and are well illustrated by photosynthesis in plants and the like. Non-biological photochemical conversions also are found to some extent in nature and also have been investigated to some extent for a controlled converting and supplying of energy needs from solar energy. The photochemical approaches include the effects of solar energy on molecular dissociation, rearrangement, or chemical reaction, or the like. Such photochemical processes and conversion are described by J. G. Calvert in "Photochemical Processes for Utilization of Solar Energy", pages 190–210, in *Introduction to the Utilization of Solar Energy*, edited by A. M. Zarem and D. D. Erway, McGraw-Hill, New York, 1963, and by Farrington Daniels in Chapter 17, "Photochemical Conversion", pages 299–329, in *Direct Use of the Sun's Energy*, Yale University Press, New Haven and London, 1964. The last mentioned includes teachings such as: "There are no promising laboratory photochemical reactions now for storing and using solar energy . . . "; "Photopolymerizations and photoisomerizations provide another group of reversible reactions suitable for consideration in the photochemical storage of sunlight"; and "The photoisomerization of maleic acid stores 70 cal $g^{-1}$ and the reversal is slow; the photoisomerization of stilbene stores 57 cal $g^{-1}$, but these reactions respond only to ultraviolet light."

B. H. Clampitt and D. E. German, in SAE Journal, May, 1960, pages 52–54, "Solar-to-Electric Energy", describe a two-stage device for converting solar energy into electrical energy with the first stage involving solar-to-chemical energy through photochemical trans to cis isomerization of certain organic acids.

U.S. Pat. No. 1,782,259 relates to light-sensitive layers containing as a light-sensitive substance an ethylene derivative forming cis-trans-isomerides for making of photographic images rather than any collection and retrieval of solar energy in significant amounts with mention of only a few isomerides, e.g., maleic and fumaric acids, trans-dibenzoylethylene, etc. However, in contrast to the limited isomerization art teachings in solar energy collection and retrieval and utilization, in the photosensitive, photographic, and like arts there are numerous teachings found of trans- and cis-isomers and their usage. For example: isomeric isocyanatostilbenes are taught as useful optical brightening agents in U.S. Pat. No. 3,555,071; cyanine compounds for image reproduction and for spectral sensitizing dyes are taught in U.S. Pat. Nos. Ref. 28,225 and 3,758,465, respectively; other cyanine compounds for print-out films and light sensitive emulsions are taught in U.S. Pat. Nos. 3,615,562 and 3,632,808; a photochromic display and storage device involving trans- and cis-indigoids is taught in U.S. Pat. No. 3,715,212. Numerous additional patent art is available on photochemical isomerizable materials, but so far as is known none is believed explicitly to teach their materials for direct usage per se through geometrical isomerization for collection, retrieval, and release for useful energy purposes of solar energy in the visible spectrum in significant amounts.

Principles for Photochemical Solar Energy Collection and Retrieval

An attractive alternative to a thermal solar conversion and storage system is one in which the solar energy is stored chemically, by means of a photochemical reaction which is reversible on demand as shown by the following reactions:

Energy Collection:

Energy Release:

In principle, such a system can operate to some extent at any time during the daylight hours. As contrasted with the threshold behavior of thermal systems, the photochemical reaction will proceed so long as some light is present, although, of course, the extent of reaction increases with increasing sunlight. The system could be started immediately at sunrise without waiting for the collector to reach high temperature, and could be run continuously until sundown. Since by definition the photochemical reaction will produce a product(s) with a higher energy content than that of the starting material, some of this chemically stored energy can be used immediately, in conjunction with any sensible heat picked up by the material during passage through the collector. The remaining high energy product(s) which accumulates during the day can be held in a storage tank(s) until needed. In the instances where the collection step or reaction involves a chemical dissociation, the resulting dissociated products can be stored separately and upon being remixed caused to reassociate to provide the energy release. In other instances where the solar energy collection provides a single stable high energy chemical, one provides means, e.g., radiation of a specific wave length or heat, to trigger energy release therefrom and regeneration of the starting photochemical. Fundamental considerations for a suitable photochemically active material are that it:

(1) absorb as much of the solar spectrum as possible;
(2) undergo an efficient photochemical reaction in the presence of sunlight to give a product(s) of higher energy content than the original material. Since this process provides the energy storage, it is desired to have the energy content of the product(s) as high as possible;
(3) be regenerated readily upon demand from the high energy product(s) with concurrent release of the stored energy as heat; and
(4) accomplish the above with little to no deterioration.

SUMMARY STATEMENT OF THE INVENTION

In the photochemical process for collection and retrieval of solar energy wherein a lower energy level isomer of an isomerizable compound is exposed to solar energy of a wavelength providing a higher energy level isomer of the isomerizable compound and this higher energy level isomer subsequently is transformed to the lower energy level isomer with exothermic release of thermal energy of utility for useful purposes, the improvement of facilitating the transforming of the higher energy level isomer by exposing the higher energy level isomer to a chemical catalyst which is an acid or base catalytic material (described more fully hereafter).

In the invention a photochemical isomerizable composition (described in detail hereafter), while dissolved and/or dispersed in water or an aqueous liquid medium (described more fully hereafter) is exposed to solar radiation and is responsive photochemically to solar energy in the visible light and near-infrared spectrum (i.e., between 350 and 1200 nm) to form its geometrical isomer of higher energy content. This composition containing the isomeric form of higher energy content generally then is held until such time as energy is desired to be retrieved therefrom. If stored, storage most likely is at ambient temperature or the temperature reached during the photoconversion of trans to cis isomer. Alternatively, shortly after its formation the higher energy isomer is used to retrieve energy therefrom and this retrieved energy stored by another means such as thermal energy heat-exchanged to a fluid medium for storage or the like. In retrieval of the stored solar energy, the isomeric form of higher energy content is "triggered" to revert and return to its original and initial isomeric form of lower energy content with an accompanying exothermic release of heat. The present invention specifically concerns certain acid or base catalysts (described more fully hereafter) and the employing of these catalysts to initiate and facilitate the reverse isomerization of the photochemical isomerizable compositions. A portion of this recovered heat is employed to continue the triggered conversion to the lower energy level isomer. The remaining heat is used as heat energy per se (e.g., to heat a residence, to run a heat pump or heat engine, etc.), stored for later usage, or converted to another energy form for usage or storage. Upon return of the isomerizable composition to its isomeric form of lower energy content, the isomerizable composition is available for re-exposure to solar energy and its conversion again to its isomeric form of higher energy content and with repetition of the precedingly described procedural sequence of collection, storage, and retrieval of its stored energy. The reversion or return of the higher energy level isomer to its lower energy level isomer generally is initiated and/or triggered through contemporaneous application of heat and exposure to catalyst, after which the reverse isomerization being exothermic is self-sustaining with there obtained a release of heat in excess of that heat needed to sustain the reverse isomerization. In other instances more exposure to the catalyst is sufficient to trigger the transformation to the lower energy level isomer and no external application of heat is needed to initiate or sustain the transformation.

The present invention is particularly useful in the method and apparatus taught in the aforementioned application, which is maturing into U.S. Pat. No. 4,004,573, in that an appropriate form of acid or base catalyst substance is included as a part of the trigger-reaction means or at least is present in the trigger-reactor means when the fluid, containing higher energy level, is passed into the trigger-reactor means with the appropriate form of the acid or base catalyst substance being present in an amount and form or configuration adapted to contact the introduced fluid and to convert the higher energy level isomer exothermically to its lower energy level isomer.

Figure 1:
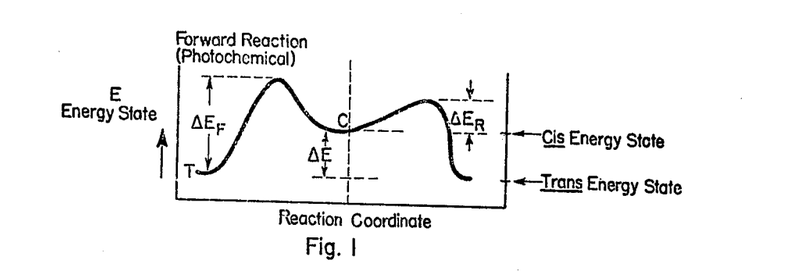
FIG. 1 illustrates a simplified energy profile diagram of the photochemical geometrical isomeric system.

As a simplified illustration of the overall mechanism of the system of photochemical storage and retrieval of solar energy, a trans-isomer in a photochemical composition upon solar radiation in the visible and near-infrared light spectrum converts at least in part to its higher energy level cis-isomer which for energy retrieval, such as by heat and/or catalyst, is triggered to convert exothermically to its original lower energy level trans-isomer. With reference to FIG. 1, which presents a simplified energy profile diagram of a photochemical geometrical isomer system employable in the invention, the illustrated cis-isomer C is of considerable (e.g., 50 + cal/gm) higher energy than the trans-isomer T. In FIG. 1, the vertical coordinate is the energy level E and the horizontal coordinate is the reaction coordinate. Also in FIG. 1, $\Delta E_F$ is the activation energy for the forward or energy storage reaction and represents an approximation to the minimum amount of energy needed from the sun for each molecular reaction.

$\Delta E_R$ is the activation energy for the reverse or energy releasing reaction and is a measure of the stability of the cis-isomer to leakage to trans, and thus controls the storage potential.

$\Delta E$ is the energy difference between the trans and cis isomers and is the net energy stored in the cis form for release when needed.

The illustrated system functions as follows:

The two reactions shown are a photochemical (or forward) reaction I during which the trans-isomer is converted to its cis-isomer and a thermal (or back) reaction II during which the cis-isomer is reconverted to the trans-isomer with release heat.

Figure 2:
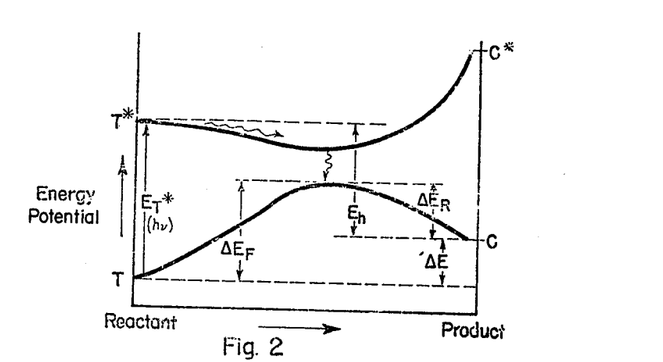
FIG. 2 presents another more detailed diagrammatic representative of the energy profile of the system.

The representation of the photochemical reaction in FIG. 1 has been quite simplified. A better representation of the phenomenon involves photochemically excited states as shown in FIG. 2. In general, the trans-isomer (T), (reactant) becomes electronically excited to a high-energy state (T*) upon exposure to sunlight of energy $h\nu$ or greater. Reaction to T* to give the cis-isomer (C), (product) is accompanied by the immediate release of some heat, $E_h$, which corresponds to the energy difference between T* and C. The stored energy, $\Delta E$, then is recovered when needed by heating C sufficiently to overcome the reverse activation energy $\Delta E_R$. This drives the system back to the original composition, i.e., predominantly trans-isomer (T), along the lower curve. The following factors generally then are considered in arriving at an optimum photochemical material to employ in the invention.

(1) The energy of T* should be low, so as to extend the absorption spectrum of the material as far toward and/or into the infrared as possible. It will be recognized that more energetic photons will still be absorbed, with the excess energy over T* appearing in the system as heat.

(2) The energy difference between the cis- and trans-isomers, $\Delta E$, should be great, as this is the amount of energy which the system is capable of storing.

(3) The reverse activation energy $\Delta E_R$, should be sufficiently high to prevent the cis-isomer from reverting to its trans-isomer under operating conditions, but low enough to allow the conversion to be triggered readily.

(4) The photochemical reaction and the reverse thermal reaction should be efficient and without competing side reactions. In addition, both isomers should be resistant to deterioration by decomposition or other side reactions under operating conditions.

(5) Both cis- and trans-isomers should be extremely soluble, desirably and preferably in the order of at least 60–80 percent (w/v) soluble, in the solvent liquid used. The greater the solubility, the higher the amount of energy that can be stored in a given volume.

(6) The system, in part or as a whole, should present no undue health or safety hazards. Thus, the cis- and trans-isomers desirably should be non-toxic at the concentrations employed.

To aid in arriving at and selecting a particular photochemical material to employ in practicing the present invention, it is possible upon preselection of a storage time and operating temperature to use the Arrhenius equation,

$$\ln k = \ln A - \Delta E_R/RT,$$

and calculate an estimated activation energy, $\Delta E_R$, required for the photochemical material wherein the isomerization of concern is a unimolecular isomerization and $k$ is a first-order rate constant. By such an estimating manner and for a storage lifetime of 2 days and an operating temperature of about 27° C (80° F), the employed photochemical material should have an activation energy of about 25 kcal/mole. Generally, this activation energy does not vary greatly as operating temperature is varied. The employed photochemical material's activation energy is related closely to the ease of "triggering" the reverse reaction for release of the stored energy, assuming that a catalyst is not used to induce the reaction. By way of example, one also can estimate the temperature required to trigger the cis to trans thermal reaction within a given time period. For example, choosing a value of $E_R = 28$ kcal/mole, if a 10-second triggering time is desired, one can employ a triggering temperature of 170° C (338° F) and likely would pressurize the system to avoid boiling the employed aqueous liquid. It should be recognized though, with the present invention wherein energy release is induced by a catalyst, that the activation energy becomes a far less significant parameter than in a thermally triggered system. This is because the catalyst reduces the effective activation energy for the reaction, thus uncoupling the ease of triggering from the problem of storage lifetime.

A photochemical isomerizable compound employable in practicing the invention has the following properties:

1. The compound will undergo a geometrical isomerization, upon the exposure to light of wavelengths between 350 nm and 1200 nm, from a thermodynamically stable isomer of lower energy content (herein referred to as "T") to a thermodynamically less stable but kinetically stable isomer of higher energy content (herein referred to as "C");
2. The absorbance maximum of C occurs at shorter wavelengths than that of T;
3. The absorbance maximum of T lies within the range 350 nm to 800 nm;
4. The ground-state enthalpy content of C is at least 10 Kcal/mole greater than that of T;
5. C can be made to revert back to T by means of a thermal initiation, which may be catalyzed or uncatalyzed, such that in doing so the higher enthalpy content of C will be released in the form of heat;
6. The activation energy for the thermal reversion of C to T is at least 20 Kcal/mole.

The compound further is characterized by a rigid linkage connecting structural moieties, which in combination with the linkage, are adaptable to undergoing geometric isomeric conversion as noted by the illustrated overall gross structures thereof of wherein
L is the rigid linkage, which may be carbon-carbon double bond or several such bonds, a carbon-nitrogen double bond or several such bonds, a cyclopropane or cyclobutane ring system, or a combination of these linkages;

$M_1$, $M_2$, $M_1'$, and $M_2'$ are structural moieties which may be hydrogen, alkyl, aryl, or heteroaromatics;

$M_1$ and $M_2$ (or $M_1'$ and $M_2'$) together may also be an aromatic or heteroaromatic ring system. Illustrations of, but not limited to, are the examples below:

wherein
A and A' may be H, alkyl, or aryl,
$R_1$, $R_1'$, $R_5$, and $R_5'$ may be H, alkyl, alkoxy, $SO_3^{\ominus}$ or some combination of these groups, $R_2$, $R_2'$, $R_4$, and $R_4'$ may be H, alkyl, alkoxy, $NX_3^\ominus$ (where X is H or alkyl), $SO_3^-$, halogen, or some combination of these groups, $R_3$ and $R_3'$ may be H, alkyl, aryl, aroyl, alkoxy, aryloxy, nitro, amino, dialkylamino, or some combination of these groups, and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together, or $R_4$ and $R_5$ (or $R_4'$ and $R_5'$) together may be an aromatic ring system either carbocyclic or heterocyclic;

and wherein

A and A' may be a $C_2$ or higher lower alkyl, haloalkyl, alkoyl, haloalkoyl, aryl, haloaryl, aroyl, heteroaroyl, $-SO_2$-haloalkyl, $-SO_2$-aryl, $-SO_2$-haloaryl, or (wherein X and Y may be H, alkyl, aryl, or a combination of these three), or a substituted aroyl wherein the substituents may be nitro, alkoxy, aroyloxy, sulfinyl, carboxy, dialkylamino, halo, or combination thereof;

$R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ (where X is H or alkyl), alkoxyl, aroyl, or a combination of these groups; and $R_1$ and $R_2$ (or $R_1'$ and $R_2'$) together or $R_2$ and $R_3$ (or $R_2'$ and $R_3'$) together, or $R_3$ and $R_4$ (or $R_3'$ and $R_4'$) together may be an aromatic ring system either carbocyclic or heterocyclic.

In the aforementioned pending related application, maturing into U.S. Pat. Nos. 4,004,572 and 4,004,573, there are specifically disclosed as useful photochemical isomerizable compounds, an organic compound (a) which is selected from several defined classes of compounds of:

indigo and thioindigo derivatives:
modified indigo and thioindigo derivatives;
stilbene derivatives;
cyanine-type dyes; and
modified aromatic olefins;

and (b) which possesses the properties and meets the general gross structural requirements aforedescribed. The incorporation by reference into this application of those two pending applications from their incorporated contents provides additional definition and specific naming of useful photochemical isomerizable compounds as well as descriptions of preparations thereof. The present invention contemplates that at least one or more of the acid or base substances, taught hereafter as catalysts in greater detail, will be useful to catalytically trigger each of the patents' taught photochemical isomerizable compounds from its cis-isomer to its trans-isomer. The present invention contemplates that other photochemical isomerizable compounds of utility for photochemical storage and retrieval of solar energy also will be able to be chemically catalytically triggered from their cis-isomer form to their trans-isomer form based on principles and teachings contained here within or obvious from the contents of the present application.

While water generally will be the sole and/or predominant liquid medium within which the employed photochemical organic isomerizable compound is dissolved and/or dispersed for exposure to solar radiation and practice of the invention, there will exist some instances wherein some of the aforedefined compounds will not be as soluble in water as desired for efficient practice of the invention. Preferably the employed photochemical compound for satisfactory solubility will have at least 60 gm thereof soluble in each 100 ml. of the employed liquid at the temperature of solar irradiation thereof. For economy and safety in practice of the invention, the employment of a liquid which predominantly consists of water is desired and preferred. Thus, generally one employs a liquid medium which comprises from 50 to 100 percent by volume of water. The balance of the liquid medium, i.e., up to 50 percent by volume is a lower alkyl alcohol, such as methanol, or a lower alkyl polyalcohol, such as ethylene glycol, or mixture thereof. Where the employed photochemical organic isomerizable compound upon employment of a water/alcohol mixture or water/glycol mixture or mixtures thereof within the aforestated proportions still is not as soluble therein as requisite for practice of the invention, then the to-be-employed compound is made more soluble by chemically modifying it through using known methods to introduce water-solubilizing substituents into the compound. Thus, a photochemically active material, M, may be made soluble in the employed aqueous solvent medium by the introduction of water-solubilizing groups, X, as exemplified by wherein $n$ is a whole number integer up to 6, X may be $^+NY_3$ (where Y may be hydrogen, alkyl, aryl, or a combination of these groups), $SO_3^-$, $CO_2^-$, $PO_4^{--}$, hydroxyl, or a combination of these groups.

By employment of such liquids and procedures, the invention is operative with distinct advantages of economy, fire safety, and health safety over using liquids which are purely solvating organic liquids per se or which comprise predominantly solvating organic liquids.

After selecting an employable photochemical isomerizable organic compound possessing those properties suitable and requisite for practice of the invention, such as from the aforedefined classes of photochemical isomerizable organic compounds as well as, by known means, varying and placing of suitable substituents thereon and modifications of the photochemical compounds encompassed there within to make these compounds suitable, one may also include a sensitizer in an amount up to 10 percent by weight of the compound along with the compound in its solubilizing aqueous liquid for exposure to solar radiation. By including a sensitizer along with the photochemical isomerizable organic compound, one extends the useful wavelength range for photochemical solar energy storage to longer wavelengths than can be utilized by the photochemically active compounds themselves. This is accomplished by means of a known technique of photochemical sensitization. For this technique to be useful, the energy storage reaction must occur not from the excited singlet state (which is produced directly from the absorption of light) but from a lower lying excited triplet state. By way of example, it has been established in the literature (see, for example D). Schulte-Frohlinde, H. Blume and H. Gusten, J. Phys. Chem. 66, 2486 (1962); D. Gegiou, K. A. Muszkat, and E. Fischer, J. Amer. Chem. Soc., 90, 3907 (1968); J. Saltiel, in "Organic Photochemistry", Vol. III, O. Chapman, Ed., Marcel Dekker, Inc., New York, 1973, Chapter 1, that this condition holds for the photochemical trans-cis isomerization of stilbenes containing substituents such as halogens, nitro groups, and carbonyl groups.

Figure 3:
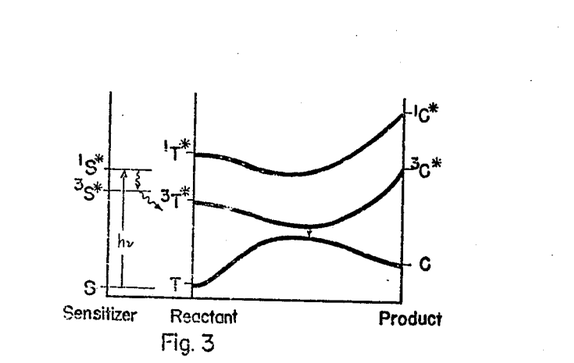
FIG. 3 presents a diagrammatic illustration of the energetics of triplet sensitization.

With reference to FIG. 3 for explanation of the energetics of triplet sensitization, the characteristic property of a useful sensitizer is that it absorbs relatively long-wavelength light (lower singlet state energy $^1S^*$ than that of $^1T^*$) and then rapidly relaxes to a triplet state $^3S^*$ with an energy greater than that of $^3T^*$ but lower than that of $^3C^*$. This is illustrated schematically in FIG. 3. The energy contained in $^3S^*$ can then be transferred to T during a collision, to form $^3T^*$ directly and regenerate the ground state sensitizer, S. Tables of data are available in the photochemical literature (see, for example, P. S. Engle and B. M. Monroe, in "Advances in Photochemistry", Vol. 8, J. N. Pitts, Jr., G. S. Hammond, and W. A. Noyes, Jr., Eds., Wiley-Interscience, New York, 1971, Chapter 6, each of which are incorporated herein by this mention thereof) for a wide variety of sensitizers, listing the energies of $^1S^*$ and $^3S^*$, the efficiency of forming $^3S^*$, and any competing reactions which may accompany energy transfer. Thus, a selection of appropriate sensitizers readily may be made for the isomerization reactions of concern to the invention. For example, benzophenone or fluorenone can be used effectively to sensitize isomerization of stilbene derivatives.

As applied to the present invention's photochemical solar energy storage, the use of sensitizers provides the advantage that a greater proportion of the solar spectrum can be utilized that is possible without the sensitizer. This is because the sensitizer will absorb light of longer wavelength than will the photochemically active material and subsequently will transfer the light energy (or a good portion thereof) to the photochemically active material in a manner effective to convert trans-isomer to cis-isomer.

As described earlier herein, after the solar energy has been absorbed by the trans-isomer so as to convert the trans-isomer to the higher energy containing cis-isomer of the employed photochemical isomerizable material, the cis-isomer subsequently is triggered to convert it back to the trans-isomer. In practice of the present invention, this triggering and/or subsequent converting of the cis-isomer to trans-isomer always is carried forth in the presence of the invention's chemical catalyst of an acid substance, or base substance, or mixture of acid substances, or mixture of base substances. For some photochemical isomerizable compounds, the mere contacting of the cis-isomer with the chemical catalyst at ambient or normal room temperature (e.g. about 20° C) is sufficient to initiate or trigger the conversion to trans-isomer. For other photochemical isomerizable compounds, in addition to contacting the cis-isomer with the chemical catalyst it may be necessary also to provide an initial heat imput to initiate the conversion to trans-isomer. Whichever is employed for a triggering or initiation of the conversion, once the conversion of cis-isomer to trans-isomer is in progress it proceeds exothermically with in so doing a portion of the exothermically produced heat capable of being utilized to continue exothermal conversion. Another portion of the exothermically produced heat, most generally the remainder of the heat not required to continue exothermal conversion of cis-isomer to trans-isomer, then is transferred, such as by a conventional heat exchanger or the like away from the region of exothermal conversion for availability for useful thermal energy applications, e.g., heating, operating of absorption refrigeration or air conditioning and the like. When an initial heat input is needed, a convenient manner in which the foregoing is accomplished involves heating a small volume of the cis-isomer to the point at which the reverse reaction becomes self-sustaining (or cascades), since more heat is released in the reaction than is required to initiate it. The remaining cis-isomer can then be fed into the self-heated and catalytic triggering means at such a rate so as to keep the reaction self-sustaining while enabling excess heat to be removed as by means of a heat-exchanger for subsequent utilization of the heat in excess of that for continuing the reverse reaction.

DETAILED DESCRIPTION AND PREFERRED EMBODIMENTS OF THE INVENTION

In the present invention the triggering (or conversion) of the cis-isomer to the trans-isomer is promoted through employment of chemical catalyzed triggering or conversion. A catalytic triggering effectively lowers the requisite activation energy for the cis-to-trans-isomer conversion and simplifies whatever heat-triggering means one may employ in the invention. Thus, photochemical isomerizable materials which ordinarily require a high temperature (i.e., considerable heat initiation) can be heat triggered at a much lower temperature, and in some instances at ambient temperature or only slightly higher than ambient temperature when the cis-isomer is brought into contact with the requisite chemical catalyst. Likewise, where a heat conversion from cis-isomer to trans-isomer can in some instances extend over a period of days, the presence of the appropriate chemical catalyst can greatly increase the speed of conversion. Employment of a catalytic heat conversion provides a significant advantages in reduction of heat input to the cis-isomer to effectuate its initial conversion as well as increasing the speed and/or providing means for control of the rate of conversion of cis-isomer to trans-isomer.

The geometrical isomerizable compound employed in the invention's method has heretofore in this disclosure been defined as possessing certain properties and as being selected from compounds possessing those properties and having a heretofore defined general structural formulae. Upon employing catalytic conversion, the property of activation energy of the employed cis-isomer no longer need be restricted by the temperature required for purely thermal triggering, but now can be as high as 40–45 Kcal/mole and possibly higher.

The chemical catalyst employed in the invention, i.e. to which the higher energy level cis-isomer is exposed, may be any of a number of acid or base substances, a mixture of the acids, or a mixture of the bases. In general the employed catalytic acid or base are those recognized and characterized as being strong acids or bases (i.e. in the particular fluid containing the higher energy level cis-isomer they are recognized in the art as being strong acids or bases). These strong acids and bases are those recognized as being acids or bases under either of the accepted art definitions of proton donor (acid) or proton acceptor (base), i.e. the Bronsted acid-base concept, or of a compound capable of attachment to an unshared pair of electrons (acid) or processing an unshared pair of electrons (base), i.e. the Lewis acid-base concept. The useful strong acids and bases additionally are characterized as being compatible with the fluid containing the photochemical isomerizable compound and also as being compatible with the photoisomerizable compound itself. By compatible is meant that the specific acid(s) or base(s), employed with a particular fluid and particular photochemical isomerizable compound, do not significantly react with either or cause destruction or change of either to a fluid or compound no longer of utility for continued practice of the present invention.

Although presently not fully understood as to how the useful acid and base catalyst materials specifically function to provide catalysis of cis isomer to trans isomer, the following possible explanation may be helpful. To date those particular acid and base materials, which are effective catalysts, and also the extent of their catalytic effectiveness apparently depends on the stability of a possible transient ionic adduct formed with the cis isomer. For a base catalyst material, its nucleophilicity and stability of a likely formed transient anion adduct are of importance. Conversely for an acid catalyst material of importance are its electrophilicity and stability of a likely formed transient cation adduct. With reference to aforedescribed overall gross structural representations of T(trans isomer) and C(cis isomer) for a useful photochemical material and wherein those structures with $M_1$, $M_1'$, $M_2$, and $M_2'$ are as hereinbefore defined, the following although employing for illustrative purposes a carbon-to-carbon double bond, and $A\oplus$ to represent an acid catalyst and $B\ominus$ to represent a base catalyst, possibly can provide an explanation of a catalytic mechanism involved in the invention:

The acids, which function as useful catalysts to initiate or induce release of energy from the cis-isomer at a temperature less than requisite in the absence of the catalytic material, are characterized by the presence of strongly acidic moieties, either present as defect sites in the crystal structure of the catalyst or present as molecular groups chemically bound to the catalyst. These acidic moieties can be either Lewis acids or proton acids. The following Table 1 presents an illustrative and representative list of acid catalyst meeting these requirements and of utility in the invention.

TABLE 1

Acid Catalysts

°Metal oxides having Lewis acid properties, such as alumina, lead oxide, zinc oxide, and silicon oxide.
°Metals having acidic surface sites, such as zinc metal.
°Protonated (hydrated) forms of the above materials.
°Mineral acids and organic acids stronger than acetic acid; the organic acids may include the following structures
$R-SO_3H$   $R-CO_2H$
where R = aryl, alkyl, substituted alkyl, substituted aryl, or polymer, and R is of such a size that the organic acid is insoluble in the liquid medium containing the photochemically active material.
°Any combination of any two or more of the above catalysts.

The above catalytic acid materials especially and particularly are effective with the useful photochemical compounds of the hereindefined classes identified as indigo and thioindigo derivatives and also modified indigo and thioindigo derivatives. These catalytic acids materials are effective somewhat lesser with the hereindefined class identified as stilbene derivatives, and have at least some catalytic effect with photochemical isomerizable compounds in the other remaining hereinafterdefined classes of compounds which possess the properties and structural requirements requisite for practice of the invention. As specific examples and representative and illustrative of the useful acid catalysts, there are neutral deactivated alumina, barium oxide (BaO), lead oxide (PbO), molybdenum oxide ($MoO_3$), TLC grade silica gel, zinc oxide (ZnO), granular cleaned zinc metal, and 4-toluene-sulfonic acid, and mixtures thereof.

Bases, which function to initiate or induce release of energy from a cis-isomer with accompanying conversion to trans isomer, are characterized by the presence of strongly basic moieties, either present as structural functional groups in the catalyst's molecular structure or present in the hydrated form of the base substance. Illustrative and representative base catalysts include: aliphatic amines, such as triethylamine; organic heterocylic amines, such as pyridine and N-methylpiperidine; alkali, alkaline earth, and transition metal salts of organic acids, alcohols, and other compounds, such as zinc acetylacetonate, zinc carbonate, sodium methoxide; strong inorganic bases, such as sodium hydroxide, etc. as well as mixtures thereof. These just mentioned base catalysts are particularly effective with the useful photochemical compound of the hereindefined classes identified as indigo and thioindigo derivatives and also modified indigo and thioindigo derivatives. They also are effective, but not necessarily to an equivalent extent with other of the photochemical isomerizable compounds in the other remaining hereinafterdefined classes of compounds.

It should be noted that due to the large number and great diversity of photochemical isomerizable compounds useful for solar energy storage and retrieval as well as the large number and great diversity of acid and base catalyst materials employable in practice of the invention that each of the aforedefined and/or named employable acid and base catalysts are not necessarily effective, useful, and even desirable catalysts for each of the useful photochemical isomerizable compounds. To practice the invention one has to consider the chemical nature, properties, reactivities, etc. of the particularly employed photochemical compound, the employed acid or base catalyst, and the liquid medium. Likewise the particular manner and parameters for the contacting of the cis-isomer with the employed catalyst should be considered. What is effective or even operative in one instance is not necessarily effective or even operative in other instances. For example, in an aprotic liquid, e.g., benzene, piperidine is an ineffective catalyst for conversion of cis N, N'-diacetylindigo to its trans form and instead apparently at room temperature causes some decomposition thereof. However, piperidine is an effective catalyst to convert cis-thioindigo to its trans isomer in benzene. Likewise pyridine in benzene is effective (although relatively slow catalysis) for conversion of cis N, N'-diacetylindigo to its trans isomer, but in the same time appears to be ineffective to catalyze cis thioindigo to its trans isomer in benzene. Additionally while sodium methoxide is an effective catalyst for cis N, N'-diacetylindigo, sodium phenoxide apparently is not an effective catalyst. Likewise as illustrative of other materials ineffective as catalysts at least for some photochemical isomerizable compounds in practice of the invention, there are neutral activated alumina, granular aluminum metal, antimony oxide ($Sb_2O_3$), cadmium oxide, calcium oxide (CaO), cobalt oxide ($Co_2O_3$), copper oxide ($Cu_2O_3$), granular iron metal, iron oxide ($Fe_2O_3$), pelleted lead metal, magnesium oxide (MgO), nickle oxide (NiO), granular tin metal, sodium carbonate, and sodium phosphate. EXAMPLES For simulated laboratory practice of the invention, there was constructed a calorimeter based on the design of Arnett et al., "J. Am. Chem. Soc.", 87, 1541 (1965). The specially constructed calorimeter also included a baseline compensator and a heater control. The calorimeter permits temperature changes in the order of 0.001° C to be detected and measured.

In the following simulated practices of the invention, 200 ml of a liquid solution containing cis isomer are in the calorimeter, the employed cis isomer being placed in the calorimeter's inner jacket and being obtained earlier upon exposure of its trans-isomer to filtered light as follows: The inner jacket of this photochemical reactor is surrounded by an outer jacket into which are placed approximately 500 ml of liquid solution containing trans isomer. Light from a 450-W mercury arc lamp is filtered first by a uranium glass filter to remove ultraviolet radiation, and then by a 0.02 M aqueous potassium dichromate ($K_2Cr_2O_7$) solution before striking the liquid solution containing trans isomer. Liquid aliquots are removed from this light-irradiated trans-isomer solution after this filtered light radiation to analyze and demonstrate that a cis-isomer rich photostationary state is obtainable. Immediately following this filtered light irradiation and after composition analysis of aliquots of the light-irradiated solution, then 200 ml of the irradiated liquid solution, now containing cis isomer, are transferred to the calorimeter's inner jacket. Within the inner jacket, the placed cis-isomer rich solution is kept stirred until thermal equilibrium is reached. Upon thermal equilibrium being reached, the cis-isomer rich solution is triggered for conversion back to its trans isomer with calorimetric measurements being taken. Generally this triggering is initiated and the conversion maintained by a particular heat input. However, in practice of the present invention, whether heat input is or is not employed, the conversion is accomplished in the presence of an acid or base catalyst, such as by bringing the cis-isomer rich solution in contact with the catalyst. If desired after conversion back to its trans isomer the solution thereof in the calorimeter's inner jacket is able to be removed from the catalyst, returned to the photochemical reactor's outer jacket, and the sequence repeated of exposure to the filtered light, transfer to the calorimeter's inner jacket, and conversion back to its trans isomer. For calibration of the calorimeter, one uses an endotherm observed in the heat of solution of naphthalene by adding an accurately weighed sample of naphthlene to a solvent therefor contained in the calorimeter's inner jacket, or alternatively an exotherm produced by a resistively heated wire.

The following Table 2 presents typical data obtained from the illustrative process simultations conducted as just described on several indigo derivatives. In these simulations, benzene is used as the liquid medium. Similar results, although not necessarily identical and equivalent, are obtainable with water-soluble derivatives in the aqueous liquid medium of the invention. The results presented in Table 2 are those wherein the reverse reaction is catalyzed by p-toluene sulfonic acid to transform cis isomer to trans isomer. In these catalyzed transformations, p-toluene sulfonic acid is employed as the catalyst. The catalyst is contained within a fragile glass ampule attached to a length of glass tubing which is inserted into the cis-isomer rich solution with the glass ampule being broken, so that catalyst contacts cis-isomer, after the cis-isomer solution reached thermal equilibrium.

TABLE 2

| Indigo Derivative | Concentration, M in [a] | ΔE, Kcal/mole [b] | ΔE, E,cal/gm [b] |
|---|---|---|---|
| N,N'-Dibenzoyl (C) | $2.50 \times 10^{-4}$ | 3.2 | 6.8 |
| N,N'-bis (4-Trifluoromethylbenzoyl) | $2.50 \times 10^{-3}$ | 5.5 | 9.1 |
| N,N'-bis (4-Trifluoromethylbenzoyl) | $2.44 \times 10^{-3}$ | 4.8 | 7.9 |
| N,N'-bis (4-Trifluoromethylbenzoyl) | $2.74 \times 10^{-3}$ | 5.1 | 8.4 |
| N,N'-bis-(1-Naphthoyl) | $1.03 \times 10^{-3}$ | [d] | [d] |
| N,N'-bis-(1-Naphthoyl) | $4.37 \times 10^{-4}$ | 1.9 | 3.3 |
| N,N'-bis-(1-Naphthoyl) | $1.00 \times 10^{-4}$ | [d] | [d] |
| N,N'-bis-(1-Naphthoyl) | $3.75 \times 10^{-4}$ | 2.4 | 4.2 |
| N,N'-bis-(2-Methoxybenzoyl) | $1.00 \times 10^{-3}$ | [e] | [e] |
| N,N'-bis-(2-Methoxybenzoyl) | $1.00 \times 10^{-3}$ | 2.7 | 5.1 |
| N,N'-bis-(2-Methoxybenzoyl) | $1.20 \times 10^{-3}$ | 3.1 | 5.9 |
| N,N'-bis- | ca. $1.00 \times$ | | |

TABLE 2-continued

| Indigo Derivative | Concentration, M in [a] | ΔE, Kcal/mole [b] | ΔE, E,cal/gm [b] |
|---|---|---|---|
| (2,4,6-Trimethylbenzoyl) | $10^{-3}$ | (f) | (f) |

Control Experiments:
ca. 30 mg p-Toluenesulfonic acid added to 200 ml benzene: small endotherm only.
ca. 30 mg p-Toluenesulfonic acid added to 200 ml of benzene containing 10μl of water: ca. 0.2 cal exotherm. This is approximately 1/3-1/5 the magnitude of the indigo exotherms listed above.
ca. 30 mg 4-Toluenesulfonic acid added to 200 ml of 8.9 × $10^{-4}$ M N,N'-bis-(2-methoxybenzoyl)indigo in benzene containing 10 μl of water: ca. 0.2 cal exotherm, as above.
ca. 30 mg p-Toluenesulfonic acid added to 200 ml of ca. 1 × $10^{-3}$ M trans-N,N'-bis-(4-trifluoromethylbenzoyl)indigo: small endotherm only.
[a] All measurements were made using 200 ml of the benzene solutions indicated. A mechanical baseline compensator was used except where noted otherwise.
[b] Assumes conversion to 100% cis at photostationary state; when the absorbance of the cis isomer at the wavelength of the trans maximum is taken into accunt, we find that our photostationary state mixtures frequently exceed 90% cis, so this is a reasonable assumption.
[c] Without baseline compensation.
[d] No data could be obtained, as the baseline drift was too steep to be compensated.
[e] An anomalously large exotherm, corresponding to some 92 kcal/mole and persisitng for over 1½ hours, was observed on this run. The cause of this anomaly, which could not be reproduced, is unknown.
[f] An attempt was made to measure the energy storage capacityof this compound in the hope that the short lifetime of the cis isomer reflected a relatively high energy content. However, the time required for thermal equilibration of the solution after irradiation (nearly 2 hours) was such that most of the cis-isomer had reverted to trans before the measurement could be made.

As further examples and in particular to substantiate the catalytic effectiveness of various useful catalytic acid materials, simulation experiments are carried forth with each of neutral deactivated alumina, barium oxide (BaO), lead oxide (PbO), molybdenum oxide ($MoO_3$), TLC-grade silica gel, zinc oxide (ZnO), granular cleaned zinc metal, mixtures of various of the foregoing, and p-toluenesulfonic acid. Each of the foregoing catalytic materials exhibited catalytic activity in thermal conversion of a cis-isomer rich photostationary state mixture of an N,N'-diacylindigo (e.g., generally N,N'-dibenzoylindigo) in benzene solution to a solution containing essentially the trans-isomer. At room-temperature and slightly higher temperatures (~30° C), the conversion to essentially pure isomer takes place in less than 30 minutes for each catalytic material listed except the molybdenum oxide wherein several hours exposure thereto is necessary for full conversion to the trans-isomer. As a comparison thereto, the same cis-isomer rich photostationary state mixtures of N,N'-diacylindigos at room temperatures are stable for over 24 hours with no noticeable reversion or return to trans-isomer in the absence of catalyst. Although the preceding simulations are conducted with only N,N'-diacylindigos and in a benzene solution, similar results, although not necessarily the same and equivalent, are obtainable with water-soluble derivatives corresponding thereto in aqueous liquid medium.

In additional simulated laboratory practices of the invention, various bases are qualitatively evaluated for catalytic activity in promoting transforming of cis-isomer to trans-isomer. For these simulated examples of N,N'-diacetylindigo and thioindigo are selected as illustrative representative photochemical isomerizable compounds to demonstrate the catalytic activity of a variety of illustrative representative bases. For N,N'-diacetylindigo there is added 0.0346 g. of its trans isomer to 500 ml. of reagent grade benzene as solvent to provide about a 2×$10^{-4}$M solution. For thioindigo there is prepared 50 ml. of about a 5×$10^{-4}$M solution of its trans isomer in reagent grade benzene. The N,N'-diacetylindigo benzene solution is light irradiated through uranium glass and potassium dichromate solution filters with light of longer than 500 nanometers for about two hours to provide a bright-orange colored cis-isomer rich photostationary solution. Under red light about 3 ml. aliquots of this cis-isomer rich N,N'-diacetylindigo benzene solution are placed in 13 cm. tall test tubes and a small amount of the base compound being evaluated then is added thereto. Where the base compound is a liquid, e.g. for piperidine and pyridine, the evaluations are with additions of two and four drops of each liquid, and where the base compound is a solid the evaluations are with estimated by eye small amounts of single and double additions of between 5 to 10 mg. For the simulated examples employing the thioindigo benzene solution, about 3 ml. aliquots thereof are transferred to the 13 cm. tall test tubes. These transferred aliquots then are irradiated with about 550 nanometer light from an Eimac/monochromator apparatus, generally for about 5 to 15 minutes, to provide a cis-isomer rich photostationary solution. The characteristic light irradiation color change from reddish-purple or pinkish-purple to orange or pinkish-orange evidenced that a cis-isomer rich solution was obtained from the irradiation. The addition of base compound being evaluated then is made with the added amount being four drops when the base compound was a liquid and being estimated to be about between 5 to 10 mg. when the base compound was a solid. In conducting these simulated laboratory practices of the invention with these two representative photochemical isomerizable compounds, for each also there are used test tubes containing non-light irradiated photochemical isomerizable compound and test tubes containing light-irradiated cis-isomer rich compound with each, except for no addition of base compound, processed as the simulated practices to serve as controls and comparison runs.

The results obtained, which are only qualitative, are summarized below in Table 3. It is important to note that the apparent effectiveness of each catalyst apparently depends on the stability of the transient adduct formed when the catalyst interacts with an indigo or thioindigo molecule. Judgment of catalytic activity is made by eye comparison based on the color of the isomerizable photochemical solution at periodic time intervals in comparison to the colors of the controls and comparison runs.

TABLE 3

| | Catalytic Activity With: | |
|---|---|---|
| Catalyst Evaluated | N,N'Diacetylindigo[a] | Thioindigo[a] |
| N-Methylpiperidine | Effective | Effective[b] |
| Triethylamine | Effective | Effective[b] |
| Pyridine | Effective[c] | Ineffective |
| Piperidine | Ineffective[d] | Effective[b] |
| Zinc acetylacetonate | Effective | Effective[c] |
| Zinc carbonate | Effective | Effective[c] |
| Sodium methoxide | Effective | [e] |
| Sodium phenoxide | Inneffective | [e] |
| Sodium hydroxide | Effective[c] | [e] |
| Sodium carbonate | Ineffective | [e] |
| Sodium phosphate | Ineffective | [e] |

[a] Catalysts were judged effective if they converted a cis-rich photostationary state solution of ca. 2×$10^{-4M\ N,N'-diacetylindigo\ or\ ca.\ 5×10^{-4}}$M thioindigo in benzene to trans within about one-half an hour. No side products were detected by thin-layer chromatography with any of the effective catalysts.
[b] Apparent ground-state complex formed.
[c] Relative slow catalysis.
[d] Caused apparent decomposition of N,N'-diacetylindigo, to form indigo.
[e] Not evaluated.

Although the preceding simulations employing various base compounds as catalysts are conducted with only N,N'-diacylindigo and thioindigo in benzene solution, similar results, although not necessarily the same and equivalent, are obtainable with water-soluble derivatives corresponding thereto in aqueous liquid medium.

Each of the acid or base substances used in practice of the invention obviously can and is contemplated as capable of being useful when incorporated into a triggering or a conversion means in any of a wide variety of geometric shapes, such as in the form of grid screens, baffles, concentric tubes, pellets, and the like. These useful shapes includes those where the catalytic acid or base substance is fixed to the geometric shape as by impregnation thereof, or as by a coating thereto, or the like, and where the geometric shape may be of inorganic material, e.g. metal, metal oxide, etc., or of organic material, e.g. a natural or synthetic resinous composition or the like.

Although the invention has been described, taught, and disclosed herein with specificity, it is to be understood that the foregoing disclosure is to be deemed merely illustrative with various changes in details, materials, and procedures being possible and obvious to one of skill in the art and with all such obvious changes considered to fall within the true spirit and meaning of the invention insofar as they encompassed within the scope of the appended claims.

We claim:

1. In the photochemical process for collection and retrieval of solar energy wherein a lower energy level isomer of an isomerizable compound, while contained in a fluid, is exposed to solar energy of a wavelength providing a higher energy level isomer of the isomerizable compound and then subsequently, while within the fluid, the higher energy level isomer is transformed to the lower energy level isomer with exothermic release of thermal energy for useful purposes, the improvement of: initiating the transforming of the higher energy level isomer to the lower energy level isomer by contacting the higher energy level isomer within the fluid with a chemical catalyst of a strong acid, or a strong base, or a mixture of strong acids, or a mixture of strong bases with the employed chemical catalyst compatible with the fluid and the isomerizable compound.

2. The process of claim 1 employing a strong acid fulfilling the definition of an acid under the Brönsted concept of acids in the fluid in which it is employed.

3. The process of claim 1 employing a strong base fulfilling the definition of a base under the Brönsted concept of bases in the fluid in which it is employed.

4. The process of claim 1 employing a strong acid fulfilling the Lewis concept of acids in the fluid in which it is employed.

5. The process of claim 1 employing a strong base fulfilling the Lewis concept of bases in the fluid in which it is employed.

6. The process of claim 1 including an initial heat imput for initiating the transforming along with said contacting.

7. The process of claim 1 including, after the initiating of the transforming, a continued conversion of additional higher energy level isomer to lower energy level isomer in the presence of or by contacting the chemical catalyst.

8. In the process of claim 1, an employing of the isomerizable compound which is a geometrical isomerizable compound possessed of the property of undergoing geometrical isomerization from its trans-isomer to its cis-isomer upon exposure to light of between 350 and 1200 nm. wavelength with an absorbance maxima for its cis-isomer at a shorter wavelength than the absorbance maxima of the trans-isomer whose absorbance maxima lies between 350 and 800 nm., and an employing of said fluid which is an aqueous liquid.

* * * * *